United States Patent
Lee et al.

(10) Patent No.: US 8,565,794 B2
(45) Date of Patent: Oct. 22, 2013

(54) METHOD AND APPARATUS FOR GROUP PAGING IN WIRELESS COMMUNICATION SYSTEM

(75) Inventors: Jae Wook Lee, Anyang-si (KR); Sung Jun Park, Anyang-si (KR); Sung Hoon Jung, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/521,039

(22) PCT Filed: Jan. 11, 2011

(86) PCT No.: PCT/KR2011/000172
§ 371 (c)(1),
(2), (4) Date: Jul. 6, 2012

(87) PCT Pub. No.: WO2011/084031
PCT Pub. Date: Jul. 14, 2011

(65) Prior Publication Data
US 2013/0012244 A1    Jan. 10, 2013

Related U.S. Application Data

(60) Provisional application No. 61/294,088, filed on Jan. 11, 2010.

(30) Foreign Application Priority Data

Jan. 10, 2011  (KR) ........................ 10-2011-0002391

(51) Int. Cl.
*H04W 68/00*   (2009.01)

(52) U.S. Cl.
USPC ........ 455/458; 455/456.1; 455/423; 455/424; 455/418; 455/419; 455/420; 370/328; 370/329; 370/275; 370/251; 370/242

(58) Field of Classification Search
USPC ................ 370/328, 329, 247, 251, 253, 242; 455/458, 456.1, 423, 424, 418, 419, 455/420
See application file for complete search history.

(56) References Cited

U.S. PATENT DOCUMENTS

| 2011/0053619 A1* | 3/2011 | Shaheen et al. ............... 455/466 |
| 2011/0134841 A1* | 6/2011 | Shaheen ..................... 370/328 |
| 2011/0158160 A1* | 6/2011 | McCullough ................ 370/328 |
| 2012/0213185 A1* | 8/2012 | Frid ............................. 370/329 |

FOREIGN PATENT DOCUMENTS

| KR | 10-2009-0025517 | 3/2009 |
| KR | 10-2009-0112738 | 10/2009 |
| WO | 00/52948 | 9/2000 |

* cited by examiner

*Primary Examiner* — Kwasi Karikari
(74) *Attorney, Agent, or Firm* — Lee, Hong, Degerman, Kang & Waimey

(57) ABSTRACT

Disclosed is a method for receiving, by a terminal, a paging message in a wireless communication system. A paging message reception method according to the present invention comprises receiving a paging message which includes task information from a base station, and performing at least one task among the initiation of a machine type communication (MTC) function, interruption of a machine type communication (MTC) function and a measurement report according to the task information included in the received paging message.

6 Claims, 9 Drawing Sheets

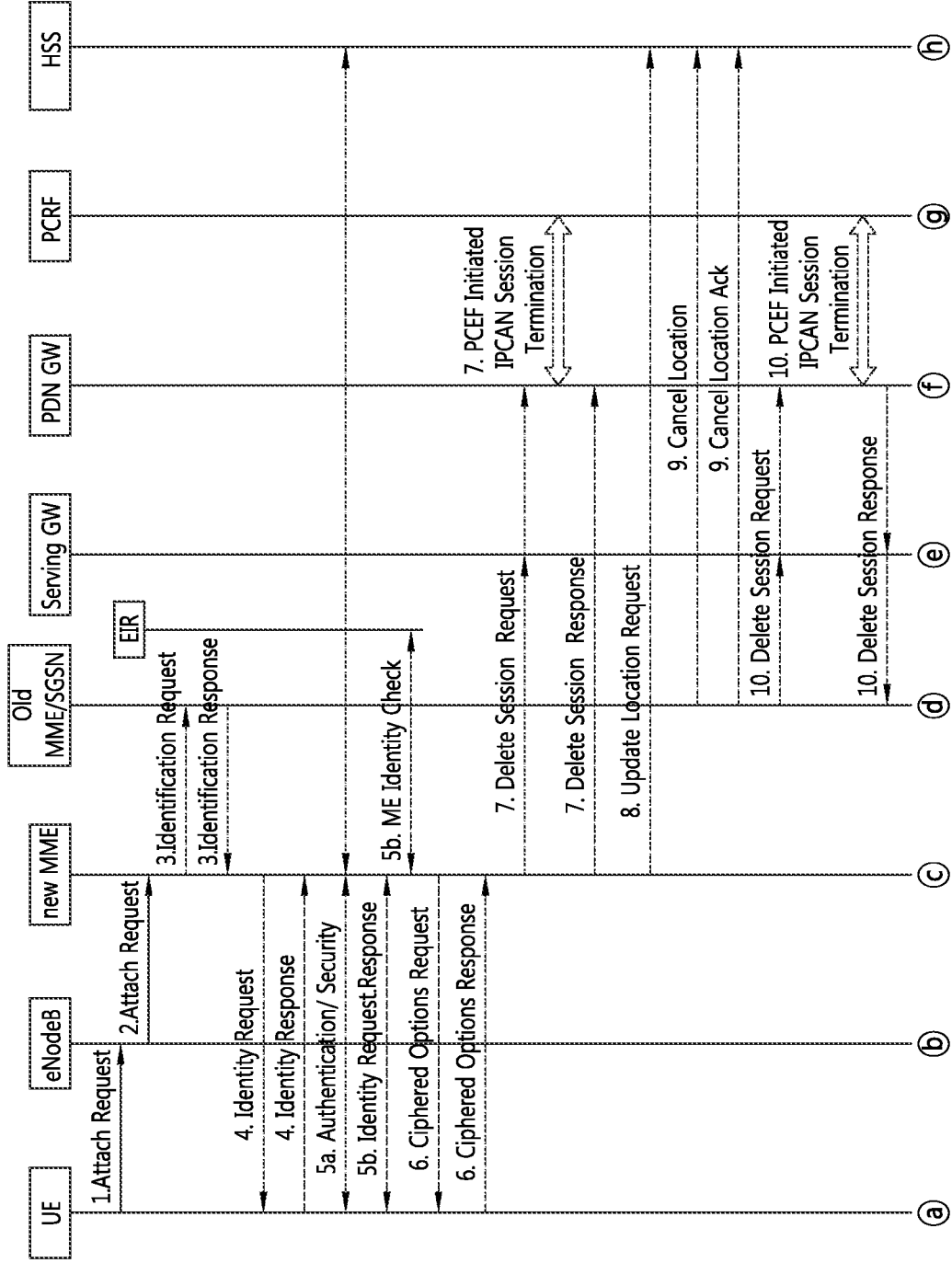

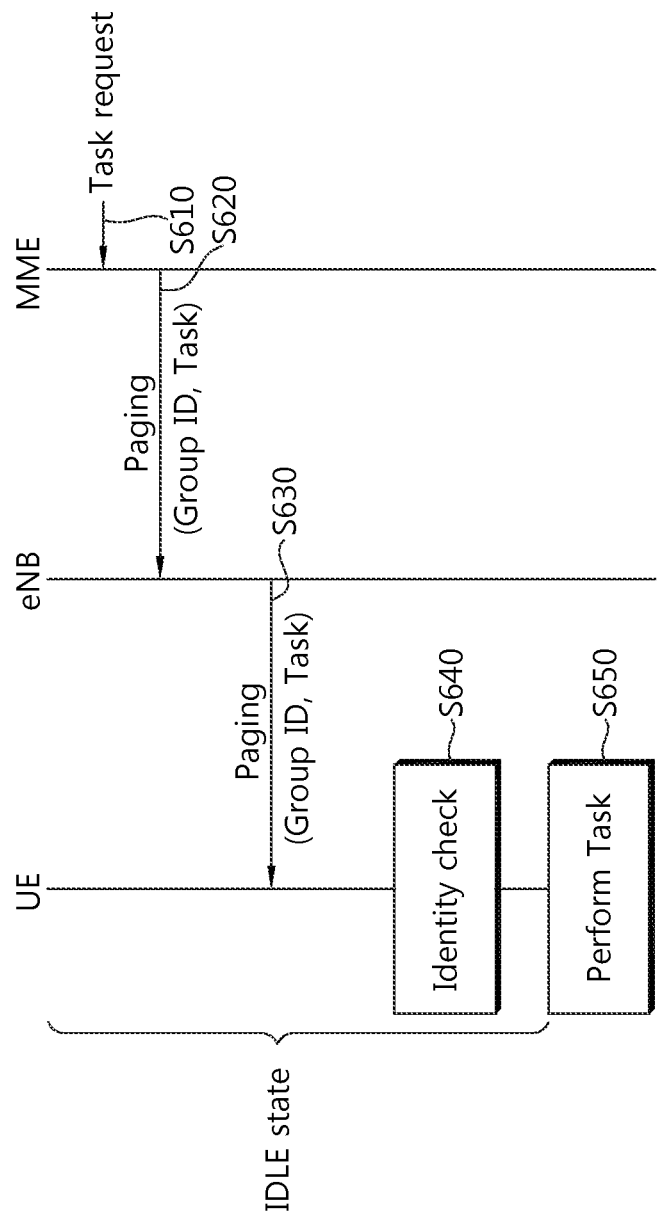

METHOD AND APPARATUS FOR GROUP PAGING IN WIRELESS COMMUNICATION SYSTEM

CROSS-REFERENCE TO RELATED APPLICATIONS

This application is the National Stage filing under 35 U.S.C. 371 of International Application No. PCT/KR2011/000172, filed on Jan. 11, 2011, which claims the benefit of earlier filing date and right of priority to Korean Application No. 10-2011-0002391, filed on Jan. 10, 2011, and also claims the benefit of U.S. Provisional Application Ser. No. 61/294,088, filed on Jan. 11, 2010, the contents of which are all incorporated by reference herein in their entirety.

BACKGROUND OF THE INVENTION

1. Field of the Invention

The present invention relates to wireless communications, and more particularly, to a method and apparatus for group paging.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

Recently, a machine type communication (MTC) system which performs communication between machines without intervention of a human user is actively utilized. A service provided through MTC is differentiated from the conventional communication service requiring human intervention, and its service range is various as follows. For example, the MTC provides various services such as tracking, metering, monitoring, payment, medical field services, remote controlling, etc., and is extended to various fields. An MTC device is a user equipment used in the MTC. The MTC device can have a limited mobility, and a plurality of MTC devices can exist in a cell. In such an MTC environment, due to the introduction of a great number of MTC devices, a problem may occur when the great number of MTC devices are managed, controlled, and paged by using the conventional paging procedure. Given that a limited number of user equipments can be paged simultaneously in a long term evolution (LTE) system, there is a need to consider a method for assigning and controlling a task for the plurality of MTC devices and a paging method.

SUMMARY OF THE INVENTION

The present invention provides a method and apparatus for effectively managing, controlling, and paging a plurality of user equipments.

In an aspect, a method of receiving a paging message by a user equipment in a wireless communication system includes receiving the paging message including task information from a base station, and performing a task according to the task information included in the received paging message, wherein the task information is at least one of an initialization of a machine type communication (MTC) function, an interruption of the MTC function, and a measurement report.

The paging message may include an identifier (ID) of the user equipment for performing the task ordered by the task information or a group ID of a group to which the user equipment belongs.

The paging message may be received in a paging occasion (PO), and the PO may be obtained based on an ID of the user equipment or a group ID of a group to which the user equipment belongs.

The group ID may be obtained when the user equipment receives signaling from the base station.

The paging message may further include a group ID of the user equipment.

The method may further include confirming whether the user equipment is a target based on the group ID, and performing the task according to the task information.

In another aspect, a method of transmitting a paging message by a base station in a wireless communication system includes transmitting a paging message including task information to at least one user equipment, and wherein the task information is at least one of an initialization of a machine type communication (MTC) function, an interruption of the MTC function, and a measurement report of the at least one user equipment.

The paging message may include an identifier (ID) of the at least one user equipment for performing the task ordered cated by the task information or a group ID of a group to which the at least one user equipment belongs.

The paging message may be transmitted in a paging occasion (PO), and the PO may be obtained based on an ID of the at least one user equipment or a group ID of a group to which the at least one user equipment belongs.

The group ID may be signaled to the at least one user equipment.

The paging message may further include a group ID of the at least one user equipment.

The group ID may allow to determine whether to the at least one user equipment performs a task according to the task information.

By introducing a group identifier (ID) to concurrently deliver a paging message to a plurality of user equipments, a load that can be generated in a wireless channel and a core network can be avoided, and also a delay time which occurs in the delivery of the paging message to the plurality of user equipments is decreased. In addition, by including a task to be performed by the user equipments to the paging message, a base station can accurately control the user equipments.

BRIEF DESCRIPTION OF THE DRAWINGS

FIGS. 5a and 5B are a flowchart showing an initial attach procedure of a UE that can be used when the UE transmits and receives its group ID according to an embodiment of the present invention.

FIG. 6 shows an example of a procedure in which a UE for receiving a paging message performs its task included in the paging message.

DESCRIPTION OF EXEMPLARY EMBODIMENTS

Figure 1:
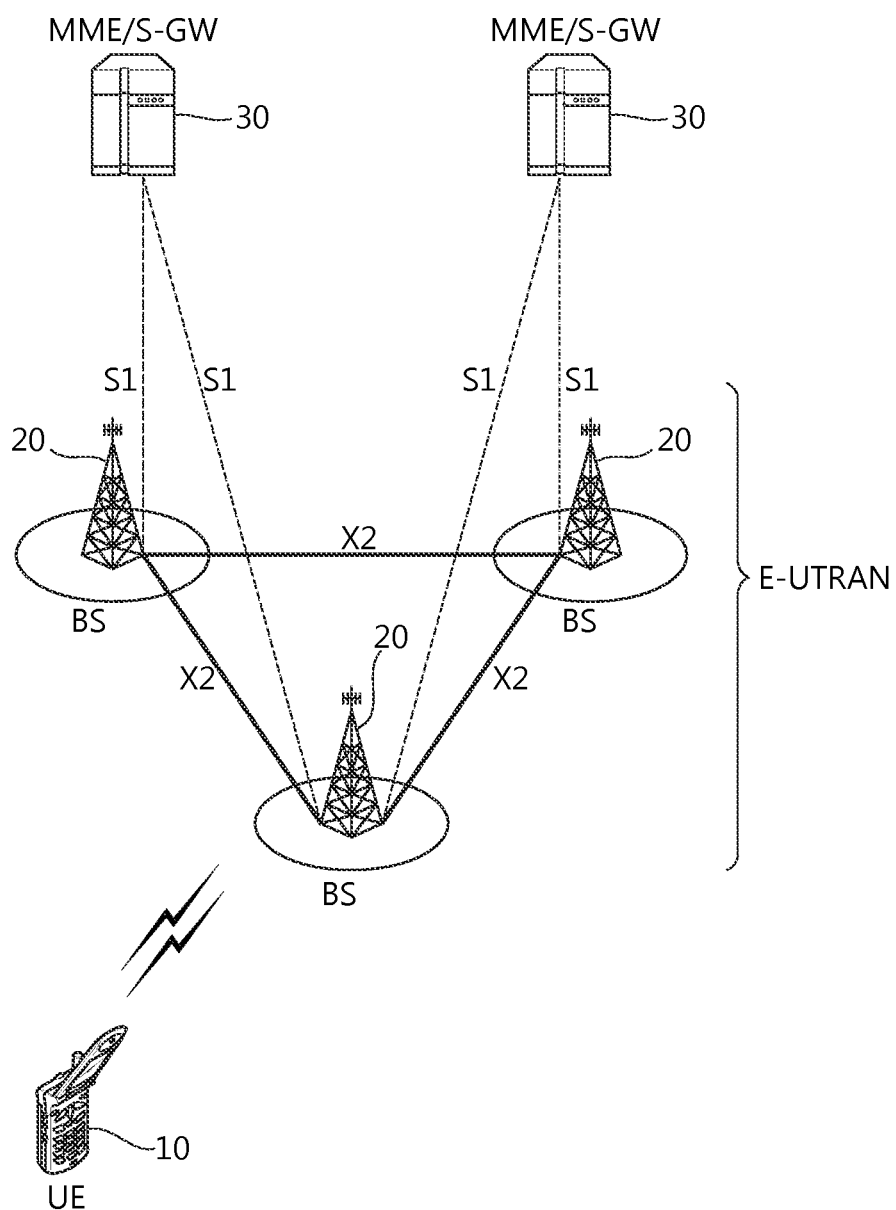
FIG. 1 shows an example of a wireless communication system to which the present invention is applicable.

FIG. 1 shows an example of a wireless communication system to which the present invention is applicable. The present invention can apply to an evolved-UMTS terrestrial radio access network (E-UTRAN) or a long term evolution (LTE)/LTE-A system.

The LTE system is a mobile communication system evolved from the UMTS system, and its standardization work is under progress in the $3^{rd}$ generation partnership project (3GPP) which is an international standard organization.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Figure 2:
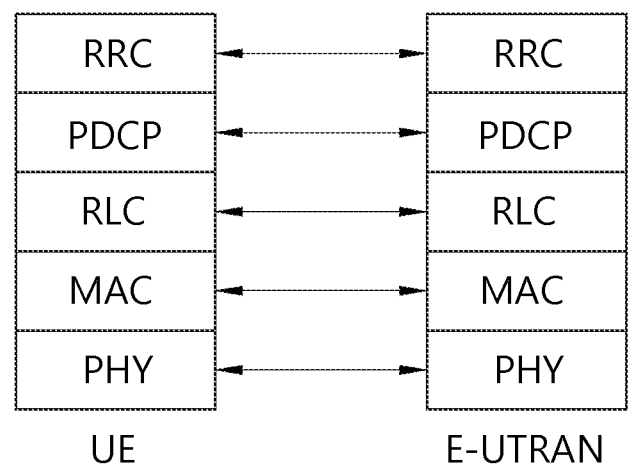
FIG. 2 and FIG. 3 each show a structure of a C-plane and a U-plane of a radio protocol of an LTE system.
Figure 3:
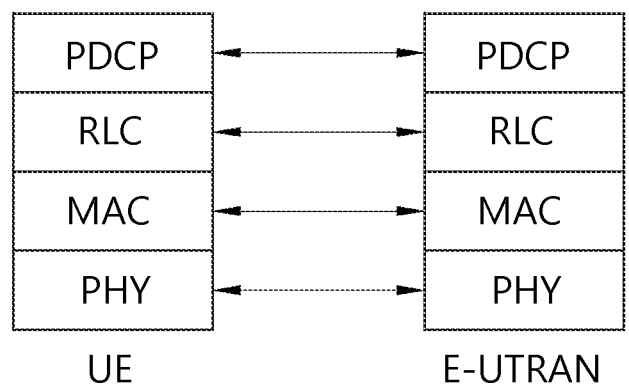

A radio interface protocol is defined in a Uu interface which is a radio section. The radio interface protocol horizontally consists of a physical layer, a data link layer, and a network layer, and is vertically divided into a user plane (U-plane) for user data transmission and a control plane (C-plane) for control signal delivery (signaling). On the basis of the three lowest layers of a well-known open system interconnection (OSI) standard model, as shown in FIG. 2 and FIG. 3, the radio interface protocol can be generally divided into a first layer (L1) including a physical (PHY) layer, a second layer (L2) including medium access control (MAC)/radio link control (RLC)/packet data convergence protocol (PDCP) layers, and a third layer (L3) including a radio resource control (RRC) layer. These layers are present in pair in a UE and an E-UTRAN, and serve for data transmission of the Uu interface.

FIG. 2 and FIG. 3 each show a structure of a C-plane and a U-plane of a radio protocol of an LTE system.

A PHY layer, which is a first layer, provides an information transfer service to a higher layer by using a physical channel. The PHY layer is connected with a higher layer, i.e., a MAC layer, through a transport channel. Data between the MAC layer and the PHY layer is transferred through the transport channel. In this case, the transport channel is roughly divided into a dedicated transport channel and a common transport channel according to whether to share the channel. Further, between different PHY layers, i.e., between a PHY layer of a transmitting side and a PHY layer of a receiving side, data is transferred through a physical channel by using a radio resource.

There are several layers in the second layer. First, a MAC layer serves to map various logical channels to various transport channels, and also serves to perform logical channel multiplexing in which several logical channels are mapped to one transport channel. The MAC layer is connected with a higher layer, i.e., an RLC layer, through a logical channel. According to a type of information to be transmitted, the logical channel is roughly divided into a control channel for transmitting information of the C-plane and a traffic channel for transmitting information of the U-plane.

An RLC layer of the second layer serves to regulate a data size so that the data size is suitable to transmit data by a lower layer to a radio section by segmenting and concatenating data received from a higher layer. In addition, to ensure a variety of quality of service (QoS) required by each radio bearer (RB), the RLC layer provides three operation modes, i.e., a transparent mode (TM), an unacknowledged mode (UM), and an acknowledged mode (AM). In particular, the AM RLC performs a retransmission function by using an automatic repeat request (ARQ) for reliable data transmission.

A PDCP layer of the second layer performs a header compression function for decreasing an Internet protocol (IP) packet header size which is relatively great and which contains unnecessary control information in order to effectively perform transmission in a radio section having a small bandwidth when transmitting an IP packet such as IPv4 or IPv6. This serves to increase transmission efficiency of the radio section by allowing only necessary information to be transmitted in a header part of data. In addition, in the LTE system, the PDCP layer also performs a security function which consists of ciphering for avoiding data interception and integrity protection for avoiding data manipulation of a third party.

An RRC layer located in the uppermost part of the third layer is defined only in the C-plane. The RRC layer serves to control the logical channel, the transport channel, and the physical channel in association with configuration, reconfiguration and release of radio bearers (RBs). Herein, the RB implies a logical path provided by the first and second layers for data delivery between the UE and the UTRAN. In general, the setup of the RB implies a process for specifying a radio protocol layer and channel properties required to provide a particular service and for determining respective detailed parameters and operations. The RB can be classified into two types, i.e., a signaling RB (SRB) and a data RB (DRB). The SRB is used as a path for transmitting an RRC message in the C-plane. The DRB is used as a path for transmitting user data in the U-plane.

Examples of a downlink transport channel for transmitting data from the network to the UE include a broadcast channel (BCH) for transmitting system information and a downlink shared channel (SCH) for transmitting user traffic or a control message. A control message or traffic of downlink multicast or broadcast services may be transmitted through the downlink SCH, or may be transmitted through an additional downlink multicast channel (MCH). Meanwhile, examples of an uplink transport channel for transmitting data from the UE to the network include a random access channel (RACH) for transmitting an initial control message and an uplink shared channel (SCH) for transmitting user traffic or a control message.

Examples of a logical channel located on a higher layer of the transport channel and mapped to the transport channel include a broadcast channel (BCCH), a paging control channel (PCCH), a common control channel (CCCH), a multicast control channel (MCCH), a multicast traffic channel (MTCH), etc.

A physical channel consists of several sub-frames located on a time axis and several sub-carriers located on a frequency axis. Herein, one sub-frame consists of a plurality of symbols on the time axis. One sub-frame consists of a plurality of RBs. One RB consists of a plurality of symbols and a plurality of sub-carriers. In addition, each sub-frame may use specific sub-frames of specific symbols (e.g., a first symbol) of a corresponding sub-frame for a physical downlink control channel (PDCCH), i.e., L1/L2 control channels. One sub-frame has a length of 0.5 ms. A transmission time interval (TTI) which is a unit time for data transmission is 1 ms corresponding to two sub-frames.

Hereinafter, an RRC state of a UE and an RRC connection method will be described. The RRC state implies whether an RRC of the UE is logically connected to an RRC of an E-UTRAN. If connected, it is an RRC_CONNECTED state, and if not connected, it is an RRC_IDLE state. Since the RRC connection exists in the UE in the RRC_CONNECTED state, the E-UTRAN can recognize a presence of the UE in a cell unit, and thus can effectively control the UE. On the other hand, the UE in the RRC_IDLE state cannot recognize the presence of the UE, and is managed by the core network in a tracking area (TA) unit which is a greater area unit than a cell. That is, regarding the UE in the RRC_IDLE state, only the presence/absence of the UE is recognized in the greater area unit than the cell, and in order to receive a mobile communication service such as voice and data, the UE must transition to the RRC_CONNECTED state. Each TA is identified by using a tracking area identifier (TAI). The UE can configure the TAI by using a tracking area code (TAC) as information which is broadcast in the cell.

When the user first turns on power of the UE, the UE first searches for a proper cell and thereafter establishes an RRC connection in the cell, and then registers information of the UE to the core network. Thereafter, the UE remains in the RRC_IDLE state. The UE in the RRC_IDLE state (re)selects a cell according to necessity, and examines system information or paging information. This is called that the UE camps on the cell. The UE in the RRC_IDLE state establishes an RRC connection with an RRC of an E-UTRAN through an RRC connection procedure only when there is a need to establish the RRC connection, and then transitions to the RRC_CONNECTED state. There are several cases where the UE in the RRC_IDLE state needs to establish the RRC connection. Examples of the cases include a case where uplink data transmission is required due to user's call attempts or a case where a response message is transmitted in response to a paging message upon receiving the paging message from an E-UTRAN.

Hereinafter, a paging procedure and an operation of a UE when a corresponding message is received will be described. Paging is used in case of delivering paging information by a core network to a UE in the RRC_IDLE state, in case of reporting a change in system information, and in case of delivering emergent information. Further, paging is used in case of reporting the change in the system information by a BS to a UE in the RRC_CONNECTED state.

As described above, since location information on the UE in the RRC_IDLE state is managed by the core network in a TA unit, the core network does not know a cell in which the UE is currently located. Accordingly, the core network delivers a paging message to all BSs included in a TA list, and upon receiving the paging message, the BS broadcasts the paging message in a cell of the BS. In this case, the BS broadcasts the paging message in a paging occasion (PO). The PO is a sub-frame for providing information on transmission of the paging message, and is calculated based on an ID of the UE.

The UE in the RRC IDLE state reads the subframe by calculating the PO on the basis of the ID of the UE. The UE receives the paging message on the basis of information regarding reception of the paging message delivered through the sub-frame, and determines whether the ID of the UE is included in the message. If the ID of the UE is included in the message, the UE establishes an RRC connection, or receives system information, or reads emergent information. Otherwise, if the ID of the UE is not included in the received paging message, the UE discards the paging message.

As described above, the UE in the RRC_IDLE state receives the paging message, and thereafter determines whether the received message is delivered for the UE, and proceeds to the subsequent process. In the conventional cellular environment, since not many UEs are present in one cell, a problem of causing a serious congestion of a wireless network does not occur even if the conventional paging method is used.

However, in an environment where a plurality of UEs are present (e.g., an MTC environment where a plurality of MTC devices are present), a problem may occur when paging the plurality of UEs by using the conventional paging process. In case of an LTE system, information can be delivered to up to 16 UEs by using one paging message. Accordingly, when considering an environment in which the plurality of UEs are present, a long time may be consumed to deliver a corresponding message to the UE(s) for which the core network intends to perform paging, and a load may be generated not only in the core network but also in a radio interface section due to the paging message when it is intended to deliver the paging message to the plurality of UEs.

In order to solve the aforementioned problem, the present invention proposes a method in which several UEs are divided into a group according to a specific criterion. Thereafter, a group ID is assigned to the UEs of each paging group, the UEs are paged for each group, and then the UEs are managed and controlled. According to the embodiment of the present invention, each UE which receives the paging message may determine whether the received paging message in a PO is for the UE, and thereafter if the message includes a group ID of a group to which the UE belongs, may perform a task according to information for ordering to perform a specific task by the UE and included in the paging message.

Figure 4:
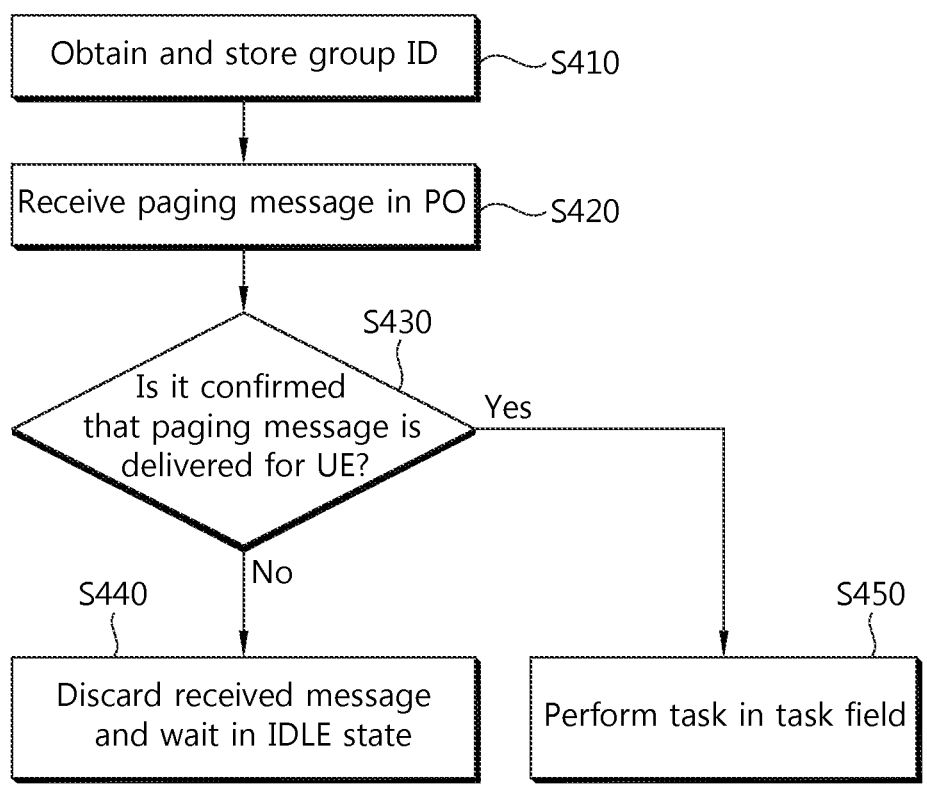
FIG. 4 is a flowchart showing an operation of a UE according to an embodiment of the present invention.

FIG. 4 is a flowchart showing an operation of a UE according to an embodiment of the present invention.

The UE obtains and stores a group ID of a group to which the UE belongs (step S410). The UE receives a paging message in a PO (step S420), and determines whether the received paging message is delivered for the UE itself (step S430). If the paging message is not delivered for the UE, the UE discards the received paging message and waits in an IDLE state (step S440). Otherwise, if the UE determines that the received paging message is delivered for the UE, the UE can perform a task requested to the UE and included in the received paging message (step S450). Hereinafter, an operation of the UE in each of the aforementioned steps and embodiments thereof will be described in detail.

In the step in which the UE obtains and then stores the group ID (step S410), the group may be determined on the basis of characteristics such as a function performed by the UE, an application program, an area to which the UE is installed, etc. That is, UEs belonging to the same group may share a characteristic of the same application program or the same area. Management including determining of the group and updating of group information may be performed by a BS.

The UE may belong to one or more groups. That is, the UE may have one or more group IDs.

The UE may obtain the group ID in various manners. The group ID of the UE may be stored in the UE (e.g., the group ID of the UE may be stored in a universal subscriber identity module (USIM) installed in the UE). Alternatively, the group ID may be obtained by receiving dedicated signaling for each UE from the BS.

A core network must know an ID of each group and information on UEs belonging to each group in order to transmit a group paging message anytime when necessary. In other words, in order to know a specific group to which a specific UE belongs, the core network must know the group ID of the UE. For this, when the group ID of the UE is stored in the UE, the UE requires a procedure for reporting its group ID to the core network. If the UE obtains its group ID information through signaling, the UE requires a procedure for obtaining its group ID from the core network.

The procedure in which the UE reports its group ID to the core network or obtains its group ID from the core network may be achieved as a procedure separate from the conventional initial attach procedure or a part of the initial attach procedure by utilizing the conventional initial attach procedure.

When configuring the procedure in which the UE reports its group ID to the core network or obtains its group ID from the core network as the part of the initial attach procedure, the UE may operate as follows.

After turning on the power of the UE, the UE establishes an RRC connection with the BS. After the UE establishes the RRC connection, the UE transmits or receives the group ID through the initial attach procedure. In this case, if the UE has its group ID information, the UE transmits its group ID to the core network. If the UE receives its group ID information through UE-specific signaling, the UE receives an ID of a group to which the UE belongs from the core network.

After transmitting or receiving the group ID through the aforementioned procedure, the UE may wait by transitioning to an RRC_IDLE state.

Figure 5B:
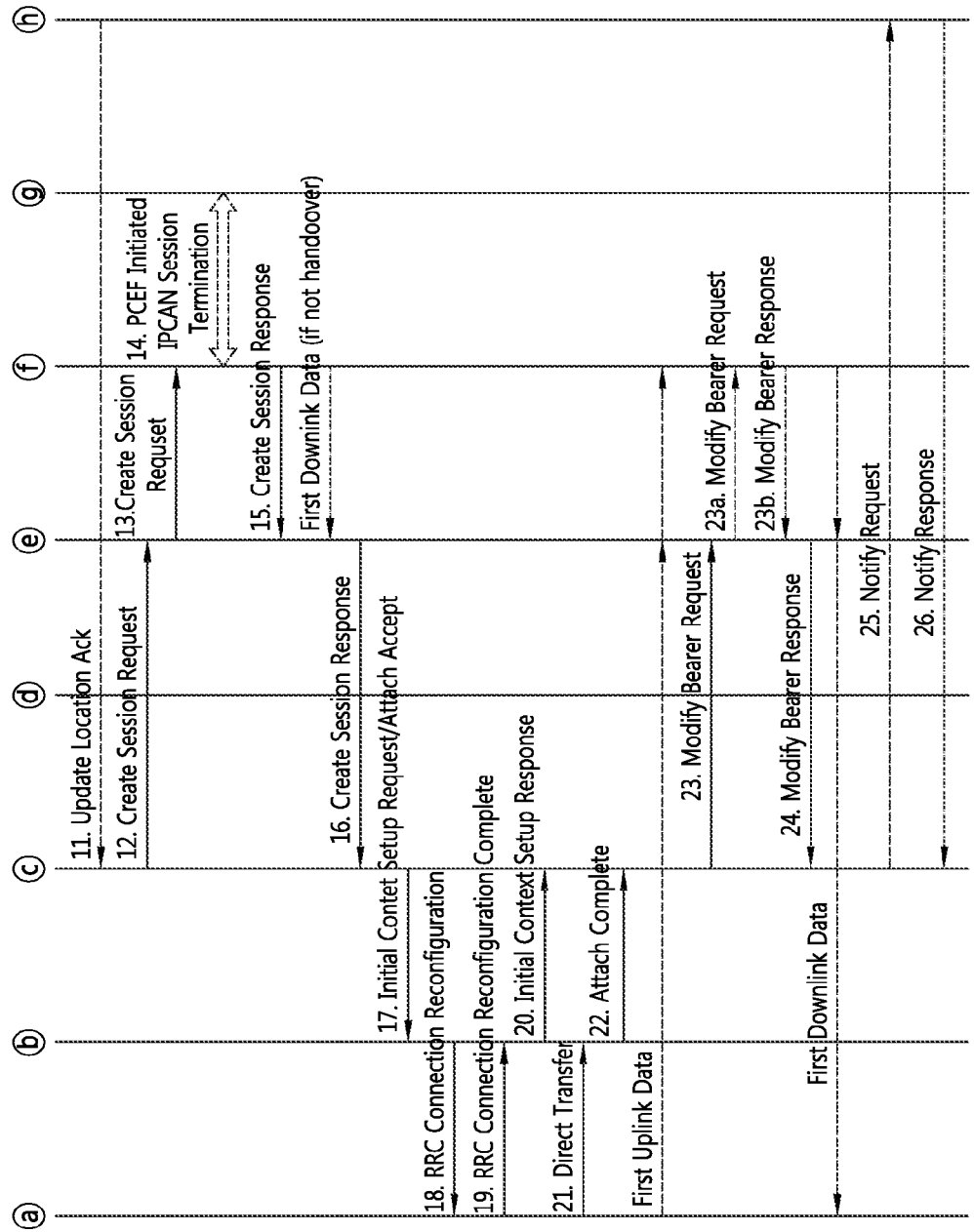

FIG. 5 including 5a and 5b is a flowchart showing an initial attach procedure of a UE that can be used when the UE transmits and receives its group ID according to an embodiment of the present invention.

When the UE intends to receive a service to which the UE needs to register, the UE must be registered to a network. Such a registration procedure is an attach procedure, and FIG. 5 shows an operation of the initial attach procedure. Details related to the attach procedure of FIG. 5 may refer to the section 5.3.2 of "3GPP TS 23.401 V9.3.0. 3rd Generation Partnership Project; Technical Specification Group Services and System Aspects; General Packet Radio Service (GPRS) enhancements for Evolved Universal Terrestrial Radio Access Network (E-UTRAN) access, (Release 9)" released in December 2009.

When the initial attach procedure is used by the UE to transmit and receive its group ID, in other words, if the UE transmits and receives its group ID through the initial attach procedure, an attach request (operations 1 and 2), an identity request/response (operation 4), and an identity request/response (operation 5b) of FIG. 5 which have conventionally used to report an ID of the UE can be used to report the group ID. That is, the group ID is included in the attach request (operations 1 and 2), the identity request/response (operation 4), and the identity request/response (operation 5b) of FIG. 5. The UE may transmit messages of the attach request (operations 1 and 2), the identity request/response (operation 4), and the identity request/response (operation 5b) by including its group ID. Accordingly, a core network can know the group ID of the UE.

In case that the UE obtains its group ID from the core network through signaling, the attach procedure can be utilized. In this case, the group ID of the UE is included in a message of an RRC connection reconfiguration (operation 18) of FIG. 5. The UE may obtain its group ID by receiving the RRC connection reconfiguration (operation 18).

In a step in which the UE receives a paging message in a PO (step S420), the UE may attempt to receive the paging message in a PO calculated by using its ID and a PO calculated by its group ID(s).

The core network delivers the paging message including the group ID to a BS included in a TA list. Upon receiving the message, the BS delivers the paging message to UEs of a corresponding group. In this case, the UE calculates a PO by using its ID, and attempts to receive the paging message at a corresponding time. The UE may attempt to receive the paging message in a PO for group paging in order to additionally receive a group paging message. As the PO for the group paging proposed in the present invention, an MTC_specific PO, a group_specific PO, and a UE_specific PO can be taken into account.

In case of transmitting the paging message in an MTC_specific occasion, the BS delivers a group paging message at a specific time determined for MTC devices among UEs in a cell. Among the UEs in the cell, the MTC device attempts to receive the group paging message only at a specific time for the MTC devices in order to receive the group paging message.

In case of transmitting the paging message in a group_specific occasion, the BS calculates a PO on the basis of the group ID, and broadcasts the paging message including the group ID only in the PO. UEs belonging to a specific group calculates the PO on the basis of its group ID(s), and attempts to receive the paging message at that time.

In case of a UE_specific occasion, when the paging message needs to be delivered for a specific group, the BS does not additionally assign a PO for MTC devices having a group ID but broadcasts the paging message including the MTC group ID in all available POs. The MTC device calculates the PO on the basis of its ID, and attempts to receive the paging message at that time.

In a step in which the UE receives the paging message to determine whether the paging message is delivered for the UE itself (step S430), the UE determines whether its ID is included in the message similarly to the conventional procedure. In addition, the UE determines whether the received paging message is delivered for the UE by using its group ID. Upon receiving the paging message from the core network, the BS may broadcast the paging message in the PO by including the group ID to the paging message or may broadcast the paging message in the PO by encoding the paging message by using the group ID. The paging message may be broadcast in the PO by using the two methods.

When the BS broadcasts the paging message in the PO by including the group ID to the paging message, the UE determines whether the group ID is included in the paging message, and reads the message if its group ID is included in the paging message. Otherwise, the UE discards the received paging message (step S440).

When the paging message is broadcast by encoding with the group ID, the UE reads the message by decoding the received paging message by using its group ID. If decoding of the message fails, this implies that the paging message is not for the UE. In this case, the UE may discard the received paging message (step S440).

If the UE receives the paging message for the UE itself, the UE determines whether the paging message includes information for ordering a task to be performed by the UE, and performs the ordered task. That is, according to the embodiment of the present invention, the paging message can be used to explicitly order the task to be performed by a specific UE(s) or MTC devices belonging to a UE group.

FIG. 6 shows an example of a procedure in which a UE for receiving a paging message performs its task included in the paging message.

When an MME is requested to transmit a message for ordering to perform a task to a specific UE or UEs of a specific group (step S610), the MME transmits a paging message to a BS (step S620), and the BS transmits again the paging message to the UE (step S630). Upon receiving the paging message, in order to determine whether the paging message is delivered for the UE, the UE determines whether its ID or its group ID is included in the paging message (step S640). If the determination result shows that the paging message is delivered for the UE, the UE confirms the task assigned to the UE and included in the paging message and performs the task (step S650).

More specifically, the UE may be an MTC device. The transmitting of the request to perform the task for the UE to a core network in step 610 may be performed by an MTC server. In this case, the core network transmits the paging message including the task to be assigned to the specific UE or the UEs of the specific group to a BS included in a TA list at the request of the MTC server. Upon receiving the paging message transmitted in step S620, the BS(s) broadcasts the paging message including the task to be performed by the UE in the PO described in step S420 of FIG. 4 (step S630). As an identifier for identifying a UE which is a target to which the paging message is transmitted, the paging message in steps S620 and S630 may include an ID and/or group ID of the UE, and may include task information indicating a task to be performed by the target UE. The task information may be transmitted by being included in the paging message as a task field.

Although it is shown in step S640 of FIG. 6 that the UE which receives the paging message checks for its ID or group ID included in the paging message to determine whether the paging message is delivered for the UE, as described in the explanation of step S430 of FIG. 4, the UE can decode the paging message by using its ID or group ID to determine whether the paging message is delivered for the UE according to whether decoding is successful.

The process in which the UE receives the message and determines whether the message is for the UE can be performed by the UE operating in an RRC_IDLE state. When the UE operating in the RRC_IDLE state receives the paging message in a PO and performs a task included in the paging message, the task may be performed in the RRC_IDLE state or an RRC_CONNECTED state. That is, according to the task to be performed, the UE may perform a procedure for a state transition.

There is no restriction on the task assigned to the UE through the paging message. The task may be a start or interruption of a specific function of the UE or an initialization of an RRC connection procedure. Alternatively, the task may be ordering of uplink data transmission of the target UE, discarding of uplink data of the target UE prepared for transmission without allowing uplink data transmission of the target UE.

Hereinafter, a detailed example of the task to be assigned to the UE will be described by taking an example of a case where the UE operates as an MTC device for convenience of explanation. Hereinafter, in addition to the MTC device, the MTC device includes a state in which a UE supporting an MTC function operates as the MTC device through a mode transition.

The task included in the paging message may be starting of a function of the MTC device.

Many MTC devices operate by using batteries, and there are many cases where the batteries are difficult to be replaced. In this case, in order to save the battery, the MTC device preferably remains in the RRC_IDLE state for a long time and performs its function only when necessary. For this, the BS may order the MTC device to perform a specific function through the paging message if there is a need to perform the specific function. In this case, the specific function performed by the MTC device may include tracking, metering, specific event detecting and reporting, etc. After receiving the paging message while in the RRC_IDLE state, the MTC device may start the MTC device function in the RRC_IDLE state without establishing the RRC connection.

As another example, the task included in the paging message may be the interruption of the MTC device function. As described above, to save power consumption, the BS may interrupt the MTC device to perform a specific operation. When an MTC server collects sufficient data for specific information, it may be determined that collecting of additional information is no longer necessary, and the specific function may be interrupted through the paging message. After receiving the paging message for requesting the interrupting of the function during the function is performed while in the RRC_IDLE state, the MTC device may remain in the RRC_IDLE state and interrupt the MTC device function.

As another example, the task that can be included in the paging message may be transmitting of uplink data. For uplink data transmission, the MTC device may establish an RRC connection with the BS and may transmit uplink data to the BS. In this case, the uplink data may be data obtained as a result of performing reporting, measuring, metering, observing, etc. That is, transmission of data generated as a result of a service provided by the MTC device may be regarded as the task. In doing so, it is possible to avoid a congestion which may occur when a plurality of MTC devices simultaneously access a cell. That is, from the perspective of the BS, the BS may transmit a paging message including an ID of a specific MTC device or a group ID of MTC devices of a specific group. By including a task for transmitting data obtained as a result of performing metering, measuring, etc., to the paging message, only the specific MTC device or the MTC devices belonging to the specific group can be allowed to access the cell and transmit data obtained as a result of performing metering, measuring, etc.

As another example, the task that can be included in the paging message may be discarding of data generated for uplink transmission by the MTC device or data stored for uplink transmission. For example, if the plurality of MTC devices in the cell monitors an occurrence of a specific event, when the specific event occurs, the plurality of MTC devices may simultaneously access the cell to report a monitoring result. This may result in generation of a congestion of a wireless network. In addition, from the perspective of the BS, if the monitoring result is obtained from any one MTC device, receiving of the monitoring result of another MTC device for reporting that the same event occurs may be unnecessary. In such a situation, it is not desirable to allow transmission of uplink data (monitoring data) and cell access of the plurality of MTC devices to receive the unnecessary monitoring since it causes only the congestion of the wireless network. When the monitoring result based on the occurrence of the specific event is received from any one MTC device, the BS may deliver a task of discarding uplink data prepared for transmission by using the paging message while disabling transmission of uplink data, on the contrary to the aforementioned task of transmitting uplink data in order to avoid unnecessary uplink data transmission of another MTC device(s) which intends to transmit the monitoring result based on the same event occurrence. Upon determining that the discarding of uplink data is its task from the paging message, the MTC device may discard data generated for uplink transmission or data stored therein, and may wait in the RRC_IDLE state.

Figure 7:
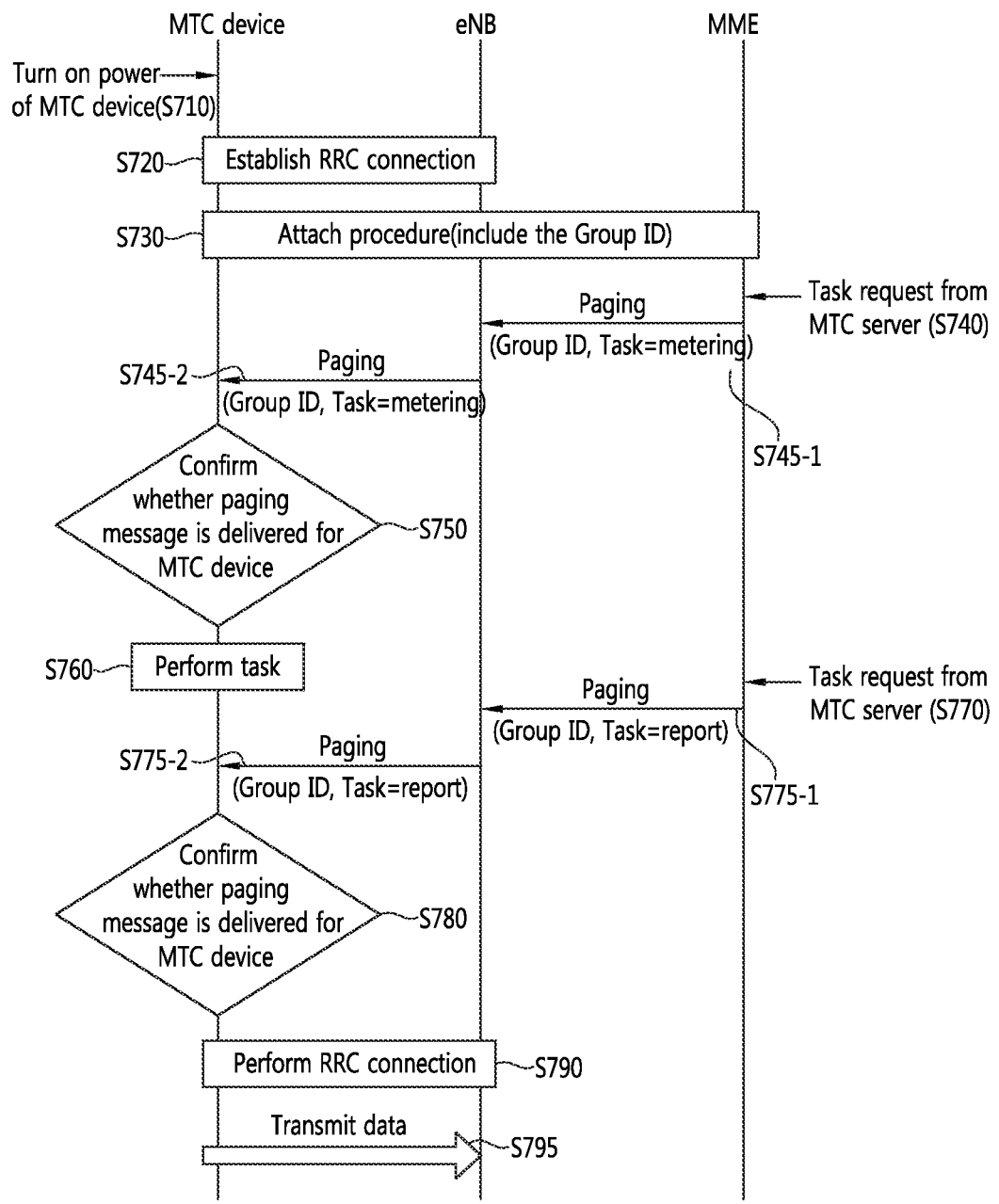
FIG. 7 shows an example of group paging of a BS and an operation of a UE for performing a task included in a paging message according to an embodiment of the present invention.

FIG. 7 shows an example of group paging of a BS and an operation of a UE for performing a task included in a paging message according to an embodiment of the present invention.

In the example of FIG. 7, the UE may be an MTC device. It is assumed that a group ID of the MTC device is known to a core network through an initial attach procedure or is signaled to the MTC device from the core network. It is assumed that the MTC device determines whether its ID or an ID of a group to which the MTC device belongs is included in a group paging message to determine whether the received paging message will be discarded.

First, when the MTC device is turned on (step S710), the MTC device establishes an RRC connection with a BS (step S720), and reports not only its ID but also a group ID to the core network or obtains its group ID through signaling from a core network through an initial attach procedure (step S730). Thereafter, the MTC device may transition to an RRC_IDLE state.

The MTC device operating in the RRC_IDLE state attempts to receive a paging message in a PO calculated by using its ID and group ID. In this case, for the paging message received by the MTC device, a request of performing a task for a specific UE is received from an MTC server (step S740). The paging message delivered to a BS of a TA list by the core network (step S745-1) is broadcast by the BS (step S745-2). The paging message includes an ID of the MTC device and/or a group ID of the MTC device and information for ordering a task to be performed by a target MTC device of the paging message.

The MTC device determines whether the received paging message includes its ID or group ID (step S750). Upon determining that the received paging message includes its group ID, the MTC device performs metering which is the task included in the paging message. In this case, the MTC device may perform the task while remaining in the RRC_IDLE state.

Thereafter, similarly to the aforementioned steps of receiving the paging message and determining whether the paging message is delivered for the MTC device (i.e., S745-1, S745-2, S750), the MTC device attempts to receive the paging message calculated based on its ID or group ID and determines whether the received paging is for the MTC device (steps S775-1, S775-2, S780). In this case, the process of transmitting the received paging message is the same as the aforementioned processes (i.e., S740, S745-1, S745-2) in which the paging message is transmitted to the MTC device through the steps S770, S775-1, S775-2. However, the paging message transmitted to the MTC device through the steps S770, S775-1, S775-2 in the example of FIG. 7 includes information of a task for reporting a metering result. The MTC device performs result reporting which is a task assigned to the MTC device and included in the paging message. That is, the MTC device establishes an RRC connection with the BS (step S790), and transmits and reports a data result (metering result) to the BS (step S795).

The core network assigns the task to MTC devices operating in the RRC_IDLE state by using the paging message. In order to effectively manage the plurality of MTC devices, the paging message may use paging by the use of a group ID of the MTC devices. The plurality of MTC devices can be effectively controlled and managed by using the group paging.

Figure 8:
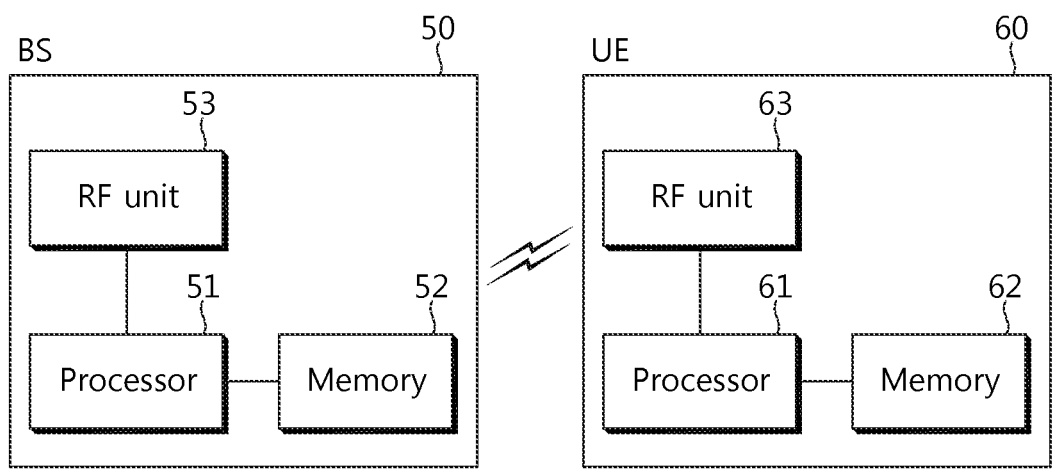
FIG. 8 is a block diagram showing a wireless communication system according to an embodiment of the present invention.

FIG. 8 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal.

The processor 51 implements the proposed functions, procedures, and/or methods. Layers of a radio interface protocol can be implemented by the processor 51. The processor 51 can implement an operation of the BS in the embodiments described with reference to FIG. 4 to FIG. 7.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal.

The processor 61 implements the proposed functions, procedures, and/or methods. Layers of a radio interface protocol can be implemented by the processor 61. The processor 61 can implement an operation of the UE in the embodiments described with reference to FIG. 4 to FIG. 7.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:
1. A method of receiving a paging message by a user equipment (UE) in a wireless communication system, the method comprising:
    receiving the paging message that includes task information in a task field from a base station (BS);
    performing a task according to the task information; and
    performing a procedure for a state transition according to the task information, wherein the task information is at least an initialization of a machine type communication (MTC) function or an interruption of the MTC function, wherein the paging message further includes a group identifier (ID) of the UE that identifies a group to which the user equipment belongs, wherein the paging message is received in a paging occasion (PO) that is a sub-frame, the PO based obtained on the group ID, wherein the sub-frame is read by calculating the PO based on an identity of the UE when the UE is in a radio resource control (RRC) idle state, wherein the PO is classified by an at least MTC specific PO, a group specific PO or a UE specific PO, wherein the MTC specific PO is used to receive the paging message only for MTC devices, wherein the group specific PO is calculated according to the group ID in order to receive the paging message only for a specific group, wherein the UE specific PO is calculated according to the identity of the UE in order to receive the paging message only for a specific UE, and wherein the group ID is obtained when the user equipment receives signaling from the BS.

2. The method of claim 1, wherein the paging message further includes ID of the UE for performing the task according to the task information or the group ID.

3. The method of claim 1, further comprising confirming whether the UE is a target based on the group ID.

4. A method of transmitting a paging message by a base station in a wireless communication system, the method comprising transmitting the paging message that includes task information in a task filed to at least one user equipment (UE); and performing a procedure for a state transition according to the task information, wherein the task information is at least an initialization of a machine type communication (MTC) function or an interruption of the MTC function, wherein the paging message further includes a group identifier (ID) of the at least one UE that identifies a group to which the at least one UE belongs, wherein the paging message is transmitted in a paging occasion (PO) that is a sub-frame , the PO obtained based on the group ID, wherein the sub-frame is read by calculating the PO based on an identity of the UE when the UE is in a radio resource control (RRC) idle state, wherein the PO is classified by at least an MTC specific PO, a group specific PO or a UE specific PO, wherein the MTC specific PO is used to receive the paging message only for MTC devices, wherein the group specific PO is calculated according to the group ID in order to receive the paging message only for a specific group, wherein the UE specific PO is calculated according to the identity of the UE in order to receive the paging message only for a specific UE, and wherein the group ID is signaled to the at least one UE.

5. The method of claim 4, wherein the paging message further includes an ID of the at least one user equipment for performing the task according to by the task information or the group ID.

6. The method of claim 4, wherein the group ID allows confirmation of whether the at least one UE is a target.

* * * * *